US011840587B2

(12) United States Patent
Zhang et al.

(10) Patent No.: US 11,840,587 B2
(45) Date of Patent: Dec. 12, 2023

(54) MOISTURE-CURABLE POLYOLEFIN FORMULATION

(71) Applicant: Dow Global Technologies LLC, Midland, MI (US)

(72) Inventors: Kainan Zhang, Shanghai (CN); Yabin Sun, Shanghai (CN); Jeffrey M. Cogen, Flemington, NJ (US); Manish Talreja, Lansdale, PA (US); Timothy J. Person, Pottstown, PA (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 215 days.

(21) Appl. No.: 17/426,477

(22) PCT Filed: Feb. 13, 2019

(86) PCT No.: PCT/CN2019/074938
§ 371 (c)(1),
(2) Date: Jul. 28, 2021

(87) PCT Pub. No.: WO2020/164005
PCT Pub. Date: Aug. 20, 2020

(65) Prior Publication Data
US 2022/0098339 A1 Mar. 31, 2022

(51) Int. Cl.
*C08F 210/02* (2006.01)
*C08F 4/70* (2006.01)
*C08K 5/00* (2006.01)
*C08L 23/08* (2006.01)

(52) U.S. Cl.
CPC ............ *C08F 210/02* (2013.01); *C08F 4/70* (2013.01); *C08K 5/0091* (2013.01); *C08L 23/0892* (2013.01); *C08F 2800/20* (2013.01); *C08L 2203/202* (2013.01); *C08L 2312/00* (2013.01)

(58) Field of Classification Search
CPC ...... C08F 210/02; C08F 2800/20; C08F 4/70; C08K 5/0091; C08L 23/0892; C08L 2203/202; C08L 2312/00
See application file for complete search history.

(56) References Cited

U.S. PATENT DOCUMENTS

| | | |
|---|---|---|
| 3,646,155 A | 2/1972 | Scott |
| 4,293,597 A | 10/1981 | Bessmer et al. |
| 4,461,867 A | 7/1984 | Surprenant |
| 5,945,466 A | 8/1999 | Ikeno et al. |
| 5,985,991 A | 11/1999 | Beljanski et al. |
| 6,277,925 B1 | 8/2001 | Biswas et al. |
| 6,936,671 B2 | 8/2005 | Mehta et al. |
| 7,365,145 B2 | 4/2008 | Yang et al. |
| 7,485,729 B2 | 2/2009 | Hsieh et al. |
| 7,527,838 B2 | 5/2009 | Correia |
| 8,686,293 B2 | 4/2014 | Yasuda |
| 8,748,511 B2 | 6/2014 | Bolte et al. |
| 8,877,885 B2 | 11/2014 | Vyakaranam et al. |
| 9,006,357 B2 | 4/2015 | Yang et al. |
| 9,156,948 B2 | 10/2015 | Brandstadt et al. |
| 9,175,188 B2 | 11/2015 | Buckanin et al. |
| 9,328,205 B2 | 5/2016 | Brandstadt et al. |
| 9,394,443 B2 | 7/2016 | Dinkar et al. |
| 9,976,028 B2 | 5/2018 | Ravichandran et al. |
| 10,047,211 B2 | 8/2018 | Talreja et al. |
| 2008/0176981 A1 | 7/2008 | Biscoglio et al. |
| 2009/0156737 A1 | 6/2009 | Schindler et al. |
| 2011/0046304 A1 | 2/2011 | Maliverney |
| 2011/0098420 A1 | 4/2011 | Takizawa et al. |
| 2014/0329090 A1 | 11/2014 | Dahlen |
| 2016/0200843 A1 | 7/2016 | Ioannidis et al. |
| 2016/0244606 A1 | 8/2016 | Ravichandran et al. |
| 2016/0319081 A1 | 11/2016 | Kumar et al. |
| 2018/0244828 A1 | 8/2018 | Goyal et al. |

FOREIGN PATENT DOCUMENTS

| | | | |
|---|---|---|---|
| EP | 2562209 | 2/2013 | |
| EP | 2776162 | 9/2014 | |
| JP | S559611 | 1/1980 | |
| JP | H05174639 | 7/1993 | |
| JP | H11172057 A | 6/1999 | |
| JP | 2013091745 | 5/2013 | |
| JP | 20130914745 A * | 5/2013 | ............... C08F 8/42 |
| JP | 2014-091807 A | 5/2014 | |
| JP | 2014193944 | 10/2014 | |
| JP | 2016020450 | 2/2016 | |
| WO | 2006101754 | 9/2006 | |
| WO | 2013052585 | 4/2013 | |
| WO | 2013052588 | 4/2013 | |
| WO | 2013052588 A1 | 4/2013 | |
| WO | 2013071078 | 5/2013 | |

(Continued)

OTHER PUBLICATIONS

European Patent Application No. 19915552.4 Extended Search Report dated Sep. 8, 2022.
PCT/CN2019/074938, International Search Report and Written Opinion dated Nov. 1, 2019.
PCT/CN2019/074938, International Preliminary Report on Patentability dated Aug. 10, 2021.
Vestoplast, Evonik, 2023, pp. 9-10.
Office Action from corresponding Japanese Application No. 2021-545783 dated Jun. 20, 2023.

* cited by examiner

*Primary Examiner* — Robert D Harlan

(57) ABSTRACT

A moisture-curable polyolefin formulation comprising a (hydrolyzable silyl group)-functional polyolefin prepolymer and a compound that is an iron (II) acetylacetonate or an iron (III) acetylacetonate, wherein each compound independently is unsubstituted or substituted. Also, methods of making and using same, a cured polyolefin made therefrom, and articles containing or made from same.

10 Claims, No Drawings

(56) References Cited

FOREIGN PATENT DOCUMENTS

| WO | 2013071078 A1 | 5/2013 |
|----|---------------|--------|
| WO | 2015149634 | 10/2015 |
| WO | 2015200015 | 12/2015 |
| WO | 2017/044319 | 3/2017 |
| WO | 2019/005439 | 1/2019 | ial
MOISTURE-CURABLE POLYOLEFIN FORMULATION

FIELD

A moisture-curable polyolefin formulation and related aspects.

INTRODUCTION

Patent application publications and patents in or about the field include US20090156737A1; US20110046304A1; US20110098420A1; US20140329090A1; US20160319081A1; US20180244828A1; U.S. Pat. Nos. 4,293,597; 4,461,867; 5,945,466; 5,985,991; 7,365,145; U.S. Pat. No. 7,485,729B2; U.S. Pat. No. 7,527,838B2; U.S. Pat. No. 8,877,885B2; U.S. Pat. No. 9,006,357B2; U.S. Pat. No. 9,175,188B2; U.S. Pat. No. 9,328,205B2; and U.S. Pat. No. 9,976,028B2.

SUMMARY

We discovered cure catalyst systems based on certain transition metal acetylacetonate compounds enhance condensation curing of moisture-curable polyolefins, and thus are useful as environmentally safe, non-toxic catalysts therefor. Our technical solution comprises a moisture-curable polyolefin formulation comprising a (hydrolyzable silyl group)-functional polyolefin prepolymer and a compound that is an iron(II) acetylacetonate or an iron(III) acetylacetonate, wherein each compound independently is unsubstituted or substituted. Also included are methods of making and using same, a cured polyolefin made therefrom, and articles containing or made from same.

DETAILED DESCRIPTION

The Summary and Abstract are incorporated here by reference. Embodiments include the following numbered aspects and detailed descriptions, including Examples.

Aspect 1. A moisture-curable polyolefin formulation comprising (A) a (hydrolyzable silyl group)-functional polyolefin prepolymer; and (B) a condensation-cure catalyst system comprising a compound that is an iron(II) acetylacetonate or an iron(III) acetylacetonate, wherein each acetylacetonate independently is unsubstituted (abbreviated "acac") or substituted with from 1 to 5 alkyl groups (abbreviated "(alkyl)acac"), wherein each alkyl group is unsubstituted (collectively called "iron (alkyl)acetylacetonate" or "iron (alkyl)acac"); wherein the amount of (A) is from 79.0 to 99.99 weight percent (wt %) and the amount of (B) is from 21.0 to 0.01 wt %, respectively, of the moisture-curable polyolefin formulation. The moisture-curable polyolefin formulation may consist of (A) and (B) only. Alternatively, the moisture-curable polyolefin formulation may comprise (A), (B), and further comprise at least one additive that is not (A) or (B), wherein the amount of (A) may be from 79.1 to 99.89 wt %, the amount of (B) may be from 0.01 to 20.8 wt %, and the total amount(s) of the at least one additive may be from 0.10 to 20.89 wt %, all based on the total weight of the moisture-curable polyolefin formulation. Examples of the optional additives and amounts thereof are described later.

Aspect 2. The moisture-curable polyolefin formulation of aspect 1 wherein the (A) (hydrolyzable silyl group)-functional polyolefin prepolymer is characterized by any one of limitations (i) to (iii): (i) each hydrolyzable silyl group is independently a monovalent group of formula $(R^2)_m$ $(R^3)_{3-m}Si$—, wherein subscript m is an integer of 1, 2, or 3; each $R^2$ is independently H, HO—, $(C_1-C_6)$alkoxy, $(C_2-C_6)$carboxy, phenoxy, $(C_1-C_6)$alkyl-phenoxy, $((C_1-C_6)$alkyl$)_2$N—, $(C_1-C_6)$alkyl(H)C=NO—, or $((C_1-C_6)$alkyl$)_2$C=NO—; and each $R^3$ is independently $(C_1-C_6)$alkyl or phenyl; (ii) the polyolefin portion of (A) is polyethylene based, poly(ethylene-co-$(C_3-C_{40})$alpha-olefin)-based, or a combination thereof; and (iii) both (i) and (ii). Each $R^2$ may be free of H and HO—, alternatively free of phenoxy and $(C_1-C_6)$alkyl-phenoxy. Each $R^2$ may be independently $(C_1-C_6)$alkoxy, $(C_2-C_6)$carboxy, $((C_1-C_6)$alkyl$)_2$N—, $(C_1-C_6)$alkyl(H)C=NO—, or $((C_1-C_6)$alkyl$)_2$C=NO—; alternatively $(C_1-C_6)$alkoxy; alternatively $(C_2-C_6)$carboxy; alternatively $((C_1-C_6)$alkyl$)_2$N—; alternatively $(C_1-C_6)$alkyl(H)C=NO—; alternatively $((C_1-C_6)$alkyl$)_2$C=NO—.

Aspect 3. The moisture-curable polyolefin formulation of aspect 1 or 2 wherein the (B) condensation-cure catalyst system is any one of (B1) to (B3): (B1) the iron(II) (alkyl)acetylacetonate (may be written as Fe(II)((alkyl)acac)$_2$); (B2) the iron(III) (alkyl)acetylacetonate (may be written as Fe(III)((alkyl)acac)$_3$); and (B3) a combination of (B1) and (B2). The (B3) combination may be a blend of (B1) and (B2) and/or a reaction product of a reaction of (B1) with (B2).

Aspect 4. The moisture-curable polyolefin formulation of any one of aspects 1 to 3 wherein each (alkyl)acetylacetonate of the iron (alkyl)acetylacetonate independently is an unsubstituted acetylacetonate or a $(C_1-C_6)$alkyl-substituted acetylacetonate; alternatively an unsubstituted acetylacetonate (i.e., 2,4-pentanedionato); alternatively a $(C_1-C_6)$alkyl-substituted acetylacetonate (i.e., a $(C_1-C_6)$alkyl-substituted 2,4-pentanedionato). Each $(C_1-C_6)$alkyl-substituted acetylacetonate independently has from 1 to 5 $(C_1-C_6)$alkyl groups, alternatively from 1 to 4 $(C_1-C_6)$alkyl groups, alternatively from 1 to 3 $(C_1-C_6)$alkyl groups, alternatively from 2 to 5 $(C_1-C_6)$alkyl groups, alternatively from 2 to 4 $(C_1-C_6)$alkyl groups, alternatively 1 $(C_1-C_6)$alkyl group, alternatively 2 $(C_1-C_6)$alkyl groups, wherein each $(C_1-C_6)$alkyl group is unsubstituted. The unsubstituted acetylacetonate may be drawn as an enolate of formula $H_3CC(=O)C(H)=C(O-)CH_3$. Alternatively, at least one (alkyl)acetylacetonate, alternatively all but one (alkyl)acetylacetonate, alternatively each (alkyl)acetylacetonate independently may be an alkyl-substituted acetylacetonate, and any remaining (alkyl)acetylacetonate may be unsubstituted. The alkyl-substituted acetylacetonate may be drawn as an enolate of formula $R^a_3CC(=O)C(R^b)=C(O^-)CR^c_3$, wherein at least one of $R^a$ to $R^c$ is unsubstituted $(C_1-C_6)$alkyl, and each of any remaining $R^a$ to $R^c$ independently is H or unsubstituted $(C_1-C_6)$alkyl. In some aspects at most two, alternatively only one of $R^a$ to $R^c$ is unsubstituted $(C_1-C_6)$alkyl, and each of any remaining $R^a$ to $R^c$ is H. In some aspects each $R^a$ and $R^c$ is H and $R^b$ is unsubstituted $(C_1-C_6)$alkyl. In some aspects all $R^a$ and $R^b$ and two $R^c$ are H and one $R^c$ is unsubstituted $(C_1-C_6)$alkyl. In some aspects the unsubstituted $(C_1-C_6)$alkyl is methyl. In some aspects each unsubstituted $(C_1-C_6)$alkyl is independently an unsubstituted $(C_1-C_3)$alkyl, alternatively an unsubstituted $(C_4-C_6)$alkyl, alternatively an unsubstituted $(C_2-C_5)$alkyl, alternatively methyl, alternatively ethyl, alternatively an unsubstituted $(C_3)$alkyl group, alternatively an unsubstituted $(C_4)$alkyl group, alternatively an unsubstituted $(C_5)$alkyl group, alternatively an unsubstituted $(C_6)$alkyl group. Examples of alkyl-substituted acetylacetonate are 3-methyl-acetylacetonate ($R^b$ is methyl and each $R^a$ and $R^c$ is H) and 1,1,5,5-tetramethyl-acetylacetonate ($R^b$ is H and two $R^a$ is methyl and two $R^c$ are methyl and the remaining $R^a$ and $R^c$ is H). Each (alkyl)acetylacetonate independently may be unsubstituted acetylacetonate or a methyl-substituted acetylacetonate; alternatively a methyl-substituted acetylacetonate that is 3-methyl-acetylacetonate or 1,1,5,5-tetramethyl-acetylacetonate; alternatively an unsubstituted acetylacetonate.

Aspect 5. The moisture-curable polyolefin formulation of any one of aspects 1 to 4 further comprising at least one additive selected from additives (C) to (L): (C) an organic peroxide; (D) a scorch retardant; (E) an antioxidant; (F) a treeing retardant (water treeing and/or electrical treeing retardant); (G) a colorant; (H) a moisture scavenger; (I) a hindered amine light stabilizer (HALS); (J) a processing aid; (K) a moisture generator; and (L) a combination of any two or more of (C) to (K). The (L) combination may be any two, alternatively any three, alternatively each of (D), (E), (F), and (I).

Aspect 6. A method of making a moisture-curable polyolefin formulation, the method comprising mixing constituents comprising (A) a (hydrolyzable silyl group)-functional polyolefin prepolymer and (B) a condensation-cure catalyst system so as to give a mixture comprising the (A) and (B); and melting or extruding the mixture so as to make the moisture-curable polyolefin formulation of any one of aspects 1 to 5. The method of making may comprise mixing constituents comprising (A), (B), and the at least one additive selected from additives (C) to (L) so as to give a mixture comprising (A), (B), and at least one of (C) to (L); and melting or extruding the mixture so as to make an embodiment of the formulation comprising (A), (B), and the at least one additive (C) to (L). Alternatively to adding (C) by mixing, after the melting or extruding step involving (A), (B), and any of (D) to (K), the additive (C) organic peroxide may be soaked into the formulation so as to give a formulation further comprising the soaked (C) organic peroxide.

Aspect 7. A moisture-cured polyolefin product made by moisture curing the moisture-curable polyolefin formulation of any one of aspects 1 to 5, or the moisture-curable polyolefin formulation made by the method of aspect 6, so as to give the moisture-cured polyolefin product. The moisture-curable polyolefin formulation may be moisture cured in a solid state or in a melt state thereof.

Aspect 8. A manufactured article comprising a shaped form of the moisture-curable polyolefin formulation of any one of aspects 1 to 5 or the moisture-cured polyolefin product of aspect 6. Examples are a coating on a substrate, a film, a layer of a laminate, and a pipe.

Aspect 9. A coated conductor comprising a conductive core and a polymeric layer at least partially surrounding the conductive core, wherein at least a portion of the polymeric layer comprises the moisture-cured polyolefin product of aspect 7. The entire polymeric layer may comprise the moisture-cured polyolefin product. The conductive core may be linear shape (e.g., like a wire) having a length and proximal and distal ends spaced apart from each other by the length of the linear shape; and the polymeric layer may completely surround the conductive core except for the proximal and distal ends. The coated conductor may further comprise one or more additional polymeric layers, which independently may or may not comprise the moisture-cured polyolefin product; and/or an outer shielding layer (e.g., a metal sheath or sleeve).

Aspect 10. A method of conducting electricity, the method comprising applying a voltage across the conductive core of the coated conductor of aspect 9 so as to generate a flow of electricity through the conductive core. The conductive core may have length and proximal and distal ends spaced apart by the length, and the electricity may flow the length of the conductive core from the proximal end to the distal end, or vice versa.

Moisture-curable polyolefin formulation. The total weight of all constituents in the moisture-curable polyolefin formulation is 100.00 wt %. The moisture-curable polyolefin formulation may be free of water (anhydrous), alternatively may further comprise water.

The moisture-curable polyolefin composition may be a one-part formulation, alternatively a multi-part formulation such as a two-part formulation. The two-part formulation may comprise first and second parts, wherein the first part consists essentially of the (A) (hydrolyzable silyl group)-functional polyolefin prepolymer and the (B) condensation-cure catalyst system and the second part consists essentially of an additional portion of (A) and optionally any one or more of constituents (C) to (L).

The moisture-curable polyolefin formulation may be in a continuous (monolithic) or divided solid form. The moisture-curable polyolefin formulation may comprise granules and/or pellets. Prior to the mixing step used to prepare the moisture-curable polyolefin formulation, the (A) (hydrolyzable silyl group)-functional polyolefin prepolymer also may be in a divided solid form (e.g., granules or pellets).

The moisture-curable polyolefin formulation may be made by combining the (A) (hydrolyzable silyl group)-functional polyolefin prepolymer with a catalyst masterbatch, comprising a dispersion of the (B) condensation-cure catalyst system in a carrier resin, to give an embodiment of the moisture-curable polyolefin formulation comprising (A), (B), and the carrier resin. The carrier resin for (B) may be an additional amount of (A), or silicon-free ethylene-based polymer such as a polyethylene homopolymer, an ethylene/alpha-olefin copolymer, an ethylene/acrylate copolymer, a low-density polyethylene (LDPE), a linear low-density polyethylene (LLDPE), a medium-density polyethylene (MDPE), or a high-density polyethylene (HDPE). The concentration of (B) in the catalyst masterbatch may be up to 20 times the target concentration of (B) in the moisture-curable polyolefin formulation. The catalyst masterbatch may be embodiments of the moisture-curable polyolefin formulation having an amount of (B) greater than 3 wt %. The catalyst masterbatch may be used to economically make other embodiments of the moisture-curable polyolefin formulation having varying lower concentrations of (B) by combining quantities of a base polymer that is an additional amount of a same or different (A) with varying amounts of the catalyst masterbatch.

The moisture-curable polyolefin formulation may consist essentially of the constituents (A) and (B). The expression consist essentially of means this embodiment of the moisture-curable polyolefin formulation may be free of added constituent(s) selected from any one of constituents (i) to (xi): (i) an unsubstituted or substituted imidazole, (ii) an unsubstituted or substituted polyester, (iii) an unsubstituted or substituted polyether, (iv) an unsubstituted or substituted urea, (v) tin; (vi) an amine-carboxylate salt; (vii) an amine (e.g., triethylamine) and ammonium compound (e.g., triethylammonium chloride, which has formula $HN(CH_2CH_3)_3Cl$); (viii) a metal carboxylate salt, wherein the metal is any metal other than calcium or iron; alternatively any metal other than iron); (ix) a carboxamidine and a guanidine (collectively called "(aza)carboxamidine"); (x) any eight of (i) to (ix); and (xi) each of (i) to (ix). For example, the moisture-curable polyolefin formulation may further comprise tin, alternatively dibutyltin dilaurate, and be free of any one, alternatively any seven, alternatively each of (i) to (iv)

and (vi) to (ix). Alternatively, the moisture-curable polyolefin formulation may free of tin and free of any one, alternatively any seven, alternatively each of (i) to (iv) and (vi) to (ix). By "added constituents" is meant a purposely introduced ingredient. Some of the constituents (i) to (xi) may be present as impurities in, or be carried over from the synthesizing of (e.g., an olefin polymerization catalyst carried over into (A)), a constituent described earlier (e.g., constituents (A) to (L)) and thereby inadvertently introduced into the moisture-curable polyolefin formulation. These impurities are not expected to have a measurable effect, beneficial or detrimental, on performance of the moisture-curable polyolefin formulation. If the moisture-curable polyolefin formulation is free of any one of constituents (i) to (xi), then the moisture-cured polyolefin product, manufactured article, and coated conductor made therefrom, and methods of making or using same, also may be free of the same any one of constituents (i) to (xi). The embodiment of the moisture-curable polyolefin formulation that consists essentially of the constituents (A) and (B) may further contain one or more of any constituents not explicitly excluded above. Examples of such one or more constituents not excluded are the optional additives (C) to (L).

The moisture-curable polyolefin formulation may consist of the constituents (A), (B), and optionally zero, one, or more of the additives (C) to (L). This embodiment of the moisture-curable polyolefin formulation excludes any constituent that is not explicitly included.

If an embodiment of the moisture-curable polyolefin formulation is free of a given constituent, so are articles comprising or made from same; so is the moisture-cured polyolefin product made therefrom; so are articles comprising or made from same; and so are methods of making or using same and uses thereof.

The moisture-curable polyolefin formulation may be characterized by enhanced scorch resistance relative to a comparative moisture-curable polyolefin formulation lacking the iron (alkyl)acetylacetonate. The scorch resistance is measured by the Scorch Time Test Method using a moving die rheometer (MDR) as described later and embodiments of the moisture-curable polyolefin formulation that also comprise 1.5 wt % of the (K) moisture generator that is (K)-1 calcium oxalate monohydrate. In some aspects the moisture-curable polyolefin formulation may be characterized by the enhanced scorch resistance.

Embodiments of the moisture-curable polyolefin formulation may be moisture cured to embodiments of the moisture-cured polyolefin product that are characterized by enhanced hot creep resistance relative to a comparative moisture-cured polyolefin product that is made from the comparative moisture-curable polyolefin formulation lacking the iron (alkyl)acetylacetonate. Such embodiments of the moisture-curable polyolefin formulation, and moisture-cured polyolefin product made therefrom, are free of (lack) the (K) moisture generator. Embodiments of the moisture-cured polyolefin product for hot creep testing are made by the Tape Extrusion and Curing Methods described later. The Hot Creep resistance of such embodiments of the moisture-cured polyolefin product is measured by the Hot Creep Test Method described later.

The moisture-curable polyolefin formulation may be characterized by any one of properties (i) to (v): (i) hot creep after 20 minutes at 200° C. of from 20% to 174%, alternatively from 20% to 90%, alternatively from 25% to 50%, as an average of three specimens measured according to the Hot Creep Test Method; (ii) a T90 crosslinking time of from 7.1 to 12 minutes measured according to the T90 Crosslinking Test Method; (iii) a maximum torque (MH) minus a minimum torque (ML) (MH–ML) is from 2.25 to 4.44 deciNewtons-meter (dN*m), alternatively from 2.50 to 4.00 dN*m, as measured according to the Moisture Curing Test Method Using Moving Die Rheometer (MDR); (iv) any two of properties (i) to (iii); and (v) each of properties (i) to (iii). The test methods are described later.

The moisture-curable polyolefin formulation comprises constituents (A) and (B), and 0, 1, or more optional constituents.

Constituent (A) the (hydrolyzable silyl group)-functional polyolefin prepolymer ("(A) prepolymer"). Polyolefin molecules containing covalently-bonded, condensation curable silicon-containing groups, wherein the polyolefin molecules are capable of further polymerization via water-based condensation curing to form covalent siloxy-silyl crosslinks between different chains of the polyolefin molecules, thereby contributing more than one structural unit to at least one type of chain of a resulting moisture-cured polymer product, which contains the siloxy-silyl crosslinks (Si—O—Si) bonded to carbon atoms of the different chains. The polyolefin portion of the (A) prepolymer may be polyethylene based, which means that the (A) prepolymer has a backbone formed by polymerization of ethylene. Alternatively, the (A) prepolymer may be poly(ethylene-co-($C_3$-$C_{40}$)alpha-olefin)-based, which means that the (A) prepolymer has a backbone formed by copolymerization of ethylene and at least one alpha-olefin.

The (A) prepolymer may be a reactor copolymer of ethylene and an alkenyl-functional hydrolyzable silane. The alkenyl-functional hydrolyzable silane may be of formula (III) $(R^2)_m(R^3)_{3-m}Si$—$(C_2$-$C_6)$alkenyl (III), wherein m, $R^2$, and $R^3$ are as defined above for formula (II). The ($C_2$-$C_6$) alkenyl may be vinyl, allyl, 3-butenyl, or 5-hexenyl. The (A) prepolymer may be a reactor copolymer of ethylene and vinyltrimethoxysilane. Vinyltrimethoxysilane is an example of the alkenyl-functional hydrolyzable silane of formula (III) wherein subscript m is 3, each $R^2$ is a ($C_1$-$C_6$)alkoxy (i.e., methoxy); and the ($C_2$-$C_6$)alkenyl is vinyl (—C(H)=CH$_2$).

Alternatively, the (A) prepolymer may be a reactor copolymer of ethylene, an alpha-olefin, and the alkenyl-functional hydrolyzable silane, such as in U.S. Pat. No. 6,936,671.

Alternatively, the (A) prepolymer may be a homopolymer of ethylene having a carbon atom backbone having the hydrolyzable silyl groups grafted thereonto, such as a polymer made by a process (e.g., a SIOPLAS™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and isolating the resulting silane-grafted polymer. The grafted polymer may be for used in a subsequent fabricating step. The SIOPLAS™ process is described in, for example, U.S. Pat. No. 3,646,155 and WO 2019/005439 A1. The MONOSIL™ process is described in, for example, US 2016/0200843 A1 and WO 2019/005439 A1.

Alternatively, the (A) prepolymer may be a copolymer of ethylene and one or more of ($C_3$-$C_{40}$)alpha-olefins and unsaturated carboxylic esters (e.g., (meth)acrylate alkyl esters), wherein the copolymer has a backbone having the hydrolyzable silyl groups grafted thereonto, such as made by a SIOPLAS™ process.

Alternatively, the (A) prepolymer may be a mixture of ethylene, a hydrolyzable silane such as the alkenyl-functional hydrolyzable silane of formula (III), and a peroxide suitable for use in a process (e.g., a MONOSIL™ process)

comprising reactively grafting a hydrolyzable unsaturated silane (e.g., vinyltrimethoxysilane) in a post-polymerization compounding or extruding step, typically facilitated by a free radical initiator such as a dialkyl peroxide, and using the resulting silane-grafted polymer immediately (without isolation) in a subsequent fabricating step.

Alternatively, the (A) prepolymer may be a mixture of a copolymer of ethylene and one or more of $(C_3-C_{40})$alpha-olefins and unsaturated carboxylic esters, a hydrolyzable silane such as the alkenyl-functional hydrolyzable silane of formula (III), and a peroxide, suitable for use in a SIOP-LAS™ or MONOSIL™ process. The alpha-olefin may be a $(C_3-C_{40})$alpha-olefin, alternatively a $(C_3-C_{20})$alpha-olefin, alternatively a $(C_3-C_{10})$alpha-olefin. The alpha-olefin may have at least four carbon atoms (i.e., be a $(C_4)$alpha-olefin or larger). Examples of the $(C_3-C_{10})$alpha-olefin are propylene, 1-butene, 1-hexene, 1-octene, and 1-decene. The peroxide may be an organic peroxide such as described in WO 2015/149634 A1, page 5, line 6, to page 6, line 2, or as described below for $(C_1)$ organic peroxide.

Alternatively, the (A) (hydrolyzable silyl group)-functional polyolefin prepolymer ("(A) prepolymer") may be: (i) a reactor copolymer of ethylene and a hydrolyzable silane; (ii) a reactor copolymer of ethylene, a hydrolyzable silane, and one or more alpha-olefins and unsaturated carboxylic esters (e.g., U.S. Pat. No. 6,936,671); (iii) a homopolymer of ethylene having a carbon backbone and a hydrolyzable silane grafted to the carbon backbone (e.g., made by the SILOPAS™ process); (iv) a copolymer of ethylene, one or more alpha-olefins and unsaturated carboxylic esters, having backbone and a hydrolyzable silane grafted to its backbone (e.g., made by the SILOPAS™ process); (v) a copolymer formed from a mixture of ethylene, hydrolyzable silane, and organic peroxide (e.g., made by the MONOSIL™ process); or (vi) a copolymer formed from a mixture of ethylene, and one or more alpha-olefins and unsaturated carboxylic esters, a hydrolyzable silane, and an organic peroxide (e.g., made by the MONOSIL™ process).

The (A) prepolymer may be present in the moisture-curable polyolefin formulation at a concentration from 79.0 to 99.99 wt %, alternatively 85.0 to 99.99 wt %, alternatively 90.0 to 99.99 wt %, alternatively 95.0 to 99.99 wt %. When the moisture-curable polyolefin formulation further comprises the at least one additive, the maximum amount of (A) may be 99.89 wt %, alternatively 99.0 wt %; based on total weight of the moisture-curable polyolefin formulation.

Constituent (B) condensation-cure catalyst system. The (B) condensation-cure catalyst system comprises any one of (B1) to (B3): (B1) iron(II) (alkyl)acetylacetonate; (B2) iron(III) (alkyl)acetylacetonate; and (B3) a combination of (B1) and (B2). The (B), alternatively the moisture-curable polyolefin formulation, may be free of any organic anion that is not the (alkyl)acetylacetonate.

The (B3) combination of the (B1) and (B2). The (B3) combination may be made when the (B1) the iron(II) (alkyl)acetylacetonate and the (B2) iron(III) (alkyl)acetylacetonate are mixed in stoichiometric proportions, alternatively non-stoichiometric proportions.

The (B) condensation-cure catalyst system may be characterized as being substantially pure before it is combined with the (A) prepolymer. The "substantially pure" (B) is characterized as being from 90 to 100 wt %, alternatively from 95 to 100 wt %, alternatively from 98 to 100 wt %, alternatively from 90, 95, or 98 to 99.99 wt % of the total weight of (B).

The (B) condensation-cure catalyst system may be in anhydrous form (free of a hydrate), alternatively in a hydrate form. The anhydrous form of the (B) may beneficially help minimize scorch of the moisture-curable polyolefin formulation. Scorch is premature moisture curing of the moisture-curable polyolefin formulation during extrusion thereof (e.g., in an extruder). The hydrate form of the (B) may beneficially further function as an in situ source of water molecules for moisture curing the moisture-curable polyolefin formulation in an anhydrous or low relative humidity environment. A balance between minimizing scorch and enabling moisture curing in situ may be achieved by using the hydrate form of the (B) and the (D) scorch retardant in the moisture-curable polyolefin formulation.

The amount of (B) condensation-cure catalyst system may be from 11.0 to 3.1 wt %, alternatively 3.0 to 0.05 wt %, alternatively 1.0 to 0.10 wt % (e.g., 0.15 wt %) of the moisture-curable polyolefin formulation.

The optional constituent (C) peroxide: a molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms, or collection of such molecules. The (C) peroxide may be added to the moisture-curable polyolefin formulation for curing comprising heating the moisture-curable polyolefin formulation comprising constituents (A), (B), and (C) to a temperature at or above the (C) peroxide's decomposition temperature.

The (C) peroxide may be the (C1) hydrocarbyl hydroperoxide. (C1) may be a compound of formula $R^O$—O—O—H, wherein $R^O$ independently is a $(C_1-C_{20})$alkyl group or $(C_6-C_{20})$aryl group. Each $(C_1-C_{20})$alkyl group independently is unsubstituted or substituted with 1 or 2 $(C_6-C_{12})$ aryl groups. Each $(C_6-C_{20})$aryl group is unsubstituted or substituted with 1 to 4 $(C_1-C_{10})$alkyl groups. The $(C_1)$ hydroperoxide may be 1,1-dimethylethyl hydroperoxide; 1,1-dimethylpropyl hydroperoxide; benzoyl hydroperoxide; tert-butyl hydroperoxide; tert-amyl hydroperoxide; or a cumyl hydroperoxide. The cumyl hydroperoxide may be isopropylcumyl hydroperoxide; t-butylcumyl hydroperoxide; or cumyl hydroperoxide; alternatively cumyl hydroperoxide (also known as cumene hydroperoxide, alpha,alpha-dimethylbenzyl hydroperoxide, CAS No. 80-15-9).

The (C) peroxide may be the (C2) organic peroxide. (C2) may be a monoperoxide of formula $R^O$—O—O—$R^O$, wherein each $R^O$ independently is as defined above. Alternatively, the (C2) may be a diperoxide of formula $R^O$—O—O—$R^a$—O—O—$R^O$, wherein $R^a$ is a divalent hydrocarbon group such as a $(C_2-C_{10})$alkylene, $(C_3-C_{10})$cycloalkylene, or phenylene, and each $R^O$ independently is as defined above. The (C2) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (C2) organic peroxide may be dicumyl peroxide.

A blend of two or more different (C) peroxides may be used.

At least one, alternatively each (C) peroxide may contain one —O—O— group.

The moisture-curable polyolefin formulation may be free of (C) peroxide. When present, the (C) peroxide may be from 0.01 to 4.5 wt %, alternatively 0.05 to 2 wt %, alternatively 0.2 to 0.8 wt % of the inventive formulation.

Without being bound by theory, it is believed that use of the (C) peroxide enables dual curing mechanisms to give an embodiment of the moisture-cured polyolefin product that is a product of moisture curing and free-radical curing of the moisture-curable polyolefin formulation. Moisture curing may form crosslinks between the hydrolyzable silane groups of (A) wherein the crosslinks have a C—Si—O—Si—C bond motif. The free-radical curing enabled by the (C) peroxide may form carbon-carbon bond crosslinks between polymer chains of (A). The dual cured product thus has a greater crosslinking content that a moisture cured only product, and thus is expected to have improved mechanical properties (e.g., modulus, hot creep performance) versus a moisture-cured only product.

Optional constituent (additive) (D) scorch retardant: a molecule that inhibits premature curing, or a collection of such molecules. Examples of a scorch retardant are hindered phenols; semi-hindered phenols; TEMPO; TEMPO derivatives; 1,1-diphenylethylene; 2,4-diphenyl-4-methyl-1-pentene (also known as alpha-methyl styrene dimer or AMSD); and allyl-containing compounds described in U.S. Pat. No. 6,277,925B1, column 2, line 62, to column 3, line 46. The polyolefin composition and crosslinked polyolefin product may be free of (D). When present, the (D) scorch retardant may be from 0.01 to 1.5 wt %, alternatively 0.1 to 1.0 wt % of the inventive formulation and/or product; all based on total weight thereof.

Optional constituent (additive) (E) an antioxidant: an organic molecule that inhibits oxidation, or a collection of such molecules. The (E) antioxidant functions to provide antioxidizing properties to the moisture-curable polyolefin formulation and/or crosslinked polyolefin product. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiiobis(2-t-butyl-5-metihylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800); stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]]propionohydrazide (IRGANOX 1024). The (E) may be 4,4'-thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. The moisture-curable polyolefin formulation and/or crosslinked polyolefin product may be free of (E). When present, the (E) antioxidant may be from 0.01 to 1.5 wt %, alternatively 0.1 to 1.0 wt % of the total weight of the moisture-curable polyolefin formulation and/or crosslinked polyolefin product.

Optional constituent (additive) (F) treeing retardant: a molecule that inhibits water and/or electrical treeing, or a collection of such molecules. The treeing retardant may be a water treeing retardant or electrical treeing retardant. The water treeing retardant is a compound that inhibits water treeing, which is a process by which polyolefins degrade when exposed to the combined effects of an electric field and humidity or moisture. The electrical treeing retardant, also called a voltage stabilizer, is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (F) may be a poly (ethylene glycol) (PEG). The polyolefin composition and crosslinked polyolefin product may be free of (F). When present, the (F) treeing retardant may be from 0.01 to 1.5 wt %, alternatively 0.1 to 1.0 wt % of the inventive formulation; all based on total weight thereof.

Optional constituent (additive) (G) a colorant. E.g., a pigment or dye. E.g., carbon black or titanium dioxide. The carbon black may be provided as a carbon black masterbatch that is a formulation of poly(1-butene-co-ethylene) copolymer (from ≥95 wt % to <100 wt % of the total weight of the masterbatch) and carbon black (from >0 wt % to ≤5 wt % of the total weight of the masterbatch. Carbon black is a finely-divided form of paracrystalline carbon having a high surface area-to-volume ratio, but lower than that of activated carbon. Examples of carbon black are furnace carbon black, acetylene carbon black, conductive carbons (e.g., carbon fibers, carbon nanotubes, graphene, graphite, and expanded graphite platelets). The moisture-curable polyolefin formulation and/or crosslinked polyolefin product may be free of (G). When present (G) may be from 0.1 to 35 wt %, alternatively 1 to 10 wt % of the inventive formulation.

Optional constituent (additive) (H) moisture scavenger. The (H) moisture scavenger functions to inhibit premature moisture curing of the moisture-curable polyolefin formulation, wherein premature moisture curing would result from premature or prolonged exposure of the moisture-curable polyolefin formulation to ambient air. Examples of (H) are octyltriethoxysilane and octyltrimethoxysilane. The moisture-curable polyolefin formulation and/or crosslinked polyolefin product may be free of (H). When present (H) may be from 0.001 to 0.2 wt %, alternatively 0.01 to 0.10 wt % of the inventive formulation.

Optional constituent (additive) (1) hindered amine light stabilizer: a molecule that contains a basic nitrogen atom that is bonded to at least one sterically bulky organo group and functions as an inhibitor of degradation or decomposition, or a collection of such molecules. The (1) is a compound that has a sterically hindered amino functional group and inhibits oxidative degradation and can also increase the shelf lives of embodiments of the polyolefin composition that contain (C) organic peroxide. Examples of suitable (1) are butanedioic acid dimethyl ester, polymer with 4-hydroxy-2,2,6,6-tetramethyl-1-piperidine-ethanol (CAS No.

65447-77-0, commercially LOWILITE 62); and N,N'-bis-formyl-N,N'-bis(2,2,6,6-tetramethyl-4-piperidinyl)-hexamethylenediamine (CAS No. 124172-53-8, commercially Uvinul 4050 H). The inventive formulation and product may be free of (1). When present, the (1) hindered amine stabilizer may be from 0.001 to 1.5 wt %, alternatively 0.002 to 1.0 wt %, alternatively 0.05 to 0.1 wt % of the inventive formulation.

Optional constituent (additive) (J) processing aid: a molecule that decrease adherence of polymer melts in manufacturing equipment such as extruders and dies and to decrease melt fracture of materials. The (J) may be fluoropolymers, polyorganosiloxanes, metal salts of fatty carboxylic acids, fatty carboxamides, waxes, ethylene oxide (co)polymers, and non-ionic surfactants. The inventive formulation and product may be free of (J). When present, the (J) processing aid may be from 0.05 to 5 wt % of the inventive formulation.

Optional constituent (additive) (K) moisture generator: (a) a hydrate molecule that upon being heated releases water molecules or (b) a latent water source molecule that upon being heated decomposes to make water molecule (as a by-product). The (K)(a) may be a hydrate form of Group 1 or 2 metal oxalate such as calcium oxalate monohydrate. The (K)(b) may be a mixture of a sulfonic acid and peroxide, which mixture upon being heated generates water. The inventive formulation and product may be free of (K). When present, the (K) moisture generator may be from 0.5 to 2.5 wt %, alternatively 1.0 to 1.9 wt % of the inventive formulation.

The inventive formulation and/or product may further contain a lubricant, mineral oil, an anti-blocking agent, a metal deactivator (e.g., oxalyl bis(benzylidene)hydrazide (OABH)), a coagent, a nucleating agent, or a flame retardant.

Any optional constituent may be useful for imparting at least one characteristic or property to the inventive formulation and/or product in need thereof. The characteristic or property may be useful for improving performance of the inventive formulation and/or product in operations or applications wherein the inventive formulation and/or product is exposed to elevated operating temperature. Such operations or applications include melt mixing, extrusion, molding, hot water pipe, and insulation layer of an electrical power cable.

Chemistry

Any chemical compound herein includes all its isotopic forms, including natural abundance forms and/or isotopically-enriched forms. The isotopically-enriched forms may have additional uses, such as medical or anti-counterfeiting applications.

Any chemical compound, chemical composition, formulation, material, or product herein may be free of any one chemical element selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zn, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that any chemical element required by the same (e.g., C, H required by polyethylene) are not excluded.

Substituted means one or more carbon-bonded hydrogen atom(s) (H atom of C—H) has/have been formally replaced by a same number of independently chosen substituent group(s) (1 substituent group per H atom of C—H) to form one or more carbon-bonded substituent group(s), up to and including per substitution, wherein all H atoms of C—H are replaced by substituent groups.

Unsubstituted means atoms consist of carbon and hydrogen atoms.

Unsubstituted ($C_1$-$C_6$)alkyl independently is straight chain, branched chain, or cyclic (in the case of an unsubstituted ($C_1$-$C_6$)alkyl that is an unsubstituted ($C_3$-$C_6$)alkyl).

Unsubstituted ($C_3$)alkyl group is a monovalent radical (monoradical) of formula $C_3H_7$. Examples are —$CH_2CH_2CH_3$ and —$CH(CH_3)_2$. Unsubstituted ($C_4$)alkyl group is a monoradical of formula $C_4H_9$. Examples are —$CH_2CH_2CH_2CH_3$, —$CH(CH_3)CH_2CH_3$, —$C(CH_3)_2CH_3$, —$CH_2CH(CH_3)CH_3$, and —$C(CH_3)_3$. Unsubstituted ($C_5$) alkyl group is a monoradical of formula $C_5H_{11}$. Examples are —$CH_2CH_2CH_2CH_2CH_3$, —$CH(CH_3)CH_2CH_2CH_3$, —$C(CH_3)_2CH_2CH_3$, —$CH_2CH(CH_3)CH_2CH_3$, —$CH_2C(CH_3)_2CH_3$, —$CH_2CH_2CH(CH_3)CH_3$, —$CH(CH_2CH_3)_2$, and —$CH_2C(CH_3)_3$. Unsubstituted ($C_6$)alkyl group is a monoradical of formula $C_6H_{13}$. Examples are —$CH_2CH_2CH_2CH_2CH_2CH_3$, —$CH(CH_3)CH_2CH_2CH_2CH_3$, —$C(CH_3)_2CH_2CH_2CH_3$, —$CH_2CH(CH_3)CH_2CH_2CH_3$, —$CH_2C(CH_3)_2CH_2CH_3$, —$CH_2CH_2CH(CH_3)CH_2CH_3$, —$CH_2CH_2C(CH_3)_2CH_3$, —$C(CH_3)(CH_2CH_3)_2$, and —$CH_2CH_2C(CH_3)_3$.

(Alkyl)acetylacetonate: a monoanionic derivative (conjugate base) of an unsubstituted or substituted acetylacetone. Unsubstituted acetylacetone is the compound of formula $CH_3C(=O)CH_2C(=O)CH_3$, which includes its enol isomer of formula $CH_3C(=O)CHC(OH)CH_3$. Unsubstituted acetylacetonate is drawn as an enolate of formula $CH_3C(=O)CH=C(O^-)CH_3$ and is formally made by mono-deprotonating the unsubstituted acetylacetone. Alkyl-substituted acetylacetone is formally derived from unsubstituted acetylacetone by replacing at least carbon-bonded H atom with a substituent group, such as $R^a$ defined above. Alkyl-substituted acetylacetonate is formally made by mono-deprotonating the substituted acetylacetone.

Carboxamide: a compound having a pentavalent functional group of formula C—C(=O)—N, wherein the functional group is not part of a heteroaromatic ring. Also known as amide.

Carboxamidine: a compound having a hexavalent functional group of formula N—C(=N—)—C, wherein the functional group is not part of a heteroaromatic ring. Also known as amidine.

Guanidine: a compound having a pentavalent functional group of formula N—C(=N—)—N, wherein the functional group is not part of a heteroaromatic ring.

Organic anion: a negatively charged ion of a hydrocarbon or a heterohydrocarbon. The negative charge (density) may reside on one or more atoms independently selected from carbon, nitrogen, oxygen, and sulfur. For example, in 1-methylethoxide (anion of 2-propanol), the negative charge resides on the oxygen atom. In unsubstituted acetylacetonate (anion of unsubstituted acetylacetone), the negative charge resides partially on the two oxygen atoms and partially on the C-3 carbon atom.

Definitions

Alternatively precedes a distinct embodiment.

Ambient or room temperature: 23° C.±1° C. unless indicated otherwise.

Aspect: embodiment of invention. "In some aspects" and like modify numbered and unnumbered aspects.

ASTM: standards organization, ASTM International, West Conshohocken, Pa., USA.

Comparative examples are used for comparisons and are not to be deemed prior art.

Free of or lacks means a complete absence of; alternatively not detectable.

IEC: standards organization, International Electrotechnical Commission, Geneva, Switzerland.

IUPAC is International Union of Pure and Applied Chemistry (IUPAC Secretariat, Research Triangle Park, North Carolina, USA).

Masterbatch: a concentrated mixture of an additive dispersed in a carrier resin.

May confers a permitted choice, not an imperative.

In generalized format "metal(roman numeral)" (e.g., "iron (II)" or "Fe(III)"), the roman numeral (e.g., (II) or (III)) indicates the formal oxidation state (e.g., +2 or +3) of the metal (e.g., iron or Fe).

Operative: functionally capable or effective.

Optional(ly): is absent (or excluded), alternatively is present (or included).

PPM or parts per million: weight based unless indicated otherwise.

Properties: measured using standard test methods and conditions known therefor unless indicated otherwise.

Ranges: include endpoints, subranges, and whole and/or fractional values subsumed therein, except a range of integers does not include fractional values.

Density: measured according to ASTM D792-13, *Standard Test Methods for Density and Specific Gravity (Relative Density) of Plastics by Displacement*, Method B (for testing solid plastics in liquids other than water, e.g., in liquid 2-propanol). Units of grams per cubic centimeter ($g/cm^3$).

Melt Index ("$I_2$"): measured according to ASTM D1238-13, using conditions of 190° C./2.16 kg, formerly known as "Condition E". Units of grams per 10 minutes (g/10 min.).

EXAMPLES

High Density Polyethylene 1 (HDPE1): a high-density polyethylene homopolymer having a density of 0.965 $g/cm^3$ and a melt index (12) of 8 g/10 minutes.

(Hydrolyzable silyl group)-functional prepolymer (A)-1: a reactor copolymer of 98.5 wt % ethylene and 1.5 wt % vinyltrimethoxysilane. Prepared by copolymerizing ethylene and vinyltrimethoxysilane in a tubular high-pressure polyethylene reactor with a free radical initiator. Available as SI-LINK™ DFDA-5451 from The Dow Chemical Company.

Condensation-cure catalyst system (B)-1: $Fe(II)(acac)_2$, wherein each acac is unsubstituted acetylacetonate. Obtained from Sinopharm Chemical Reagent Co., Ltd, China.

Condensation-cure catalyst system (B)-2: $Fe(III)(acac)_3$, wherein each acac is unsubstituted acetylacetonate, also called 2,4-pentanedionato. Obtained from TCI Shanghai, China.

Condensation-cure catalyst system (B)-3: $Fe(III)(3\text{-methyl-acac})_3$, wherein each 3-methyl-acac is 3-methylacetylacetonate, also called 3-methyl-2,4-pentanedionato. Was synthesized according to the procedure of European Patent No. 2 776 162 B1.

Condensation-cure catalyst system (B)-4: $Fe(III)(1,1,5,5\text{-tetramethyl-acac})_3$, wherein each 1,1,5,5-tetramethyl-acac is 1,1,5,5-tetramethyl-acetylacetonate, also called 2,6-dimethyl-3,5-heptanedionato. Obtained from Strem Chemical.

Antioxidant (E)-1: pentaerythritol tetrakis(3-(3,5-bis(1,1-dimethylethyl)-4-hydroxyphenyl)propionate (e.g., IRGANOX 1010, CAS Number 6683-19-8; BASF)

Antioxidant (E)-2: 2',3-bis[[3-[3,5-di-tert-butyl-4-hydroxyphenyl]propionyl]]propionohydrazide (IRGANOX 1024; BASF).

Moisture generator (K)-1: calcium oxalate monohydrate. used as source of water for curing experiments conducted using a moving die rheometer (MDR) instrument.

Part A: Formulations that Include (K)-1 Moisture Generator

Moisture-curable polyolefin formulation Compounding Method 1: in a HAAKE mixer (Thermo Fisher Scientific) melt (A) (hydrolyzable silyl group)-functional polyolefin prepolymer (e.g., ((A)-1) at 120° C. and 0 rotations per minute (rpm) for 5 minutes, then at 120° C. and 45 rpm for 2.5 minutes. To completely melted (A) promptly add (B) condensation-cure catalyst system. Mix the contents at 120° C. and 45 rpm for 1 minute. If desired, then add (K) moisture generator (e.g., (K)-1) portion-wise, and then continue mixing at 120° C. and 45 rpm for 2 minutes. Remove the material from the mixer and press samples into plaques according to the Plaque Preparation Test Method.

Plaque Preparation Test Method: Press samples of the material from the Moisture-curable polyolefin formulation Compounding Method 1 into plaques at 120° C. and 0.5 megapascal (MPa) for 20 seconds to give a plaque with thickness of 1 to 4 millimeters (mm). Plaque thickness may vary depending upon, among other things, extent of scorch of the formulation during the preparation thereof (e.g., in HAAKE mixer).

Moisture Curing Test Method Using Moving Die Rheometer (MDR): subject 4.5 gram samples of the material obtained from the Moisture-curable polyolefin formulation Compounding Method 1 to curing at 180° C. using a moving die rheometer according to ASTM D5289-17 (*Standard Test Method for Rubber Property—Vulcanization Using Rotorless Cure Meters*). Using the plaques made by the Plaque Preparation Test Method measure the minimum torque (ML) at 180° C. using MDR and the following procedure. Heat test sample in a moving die rheometer (MDR) instrument MDR2000 (Alpha Technologies) at 180° C. for 20 minutes while monitoring change in torque for oscillatory deformation of 0.5 degree arc at 100 cycles per minute (cpm; 1.67 Hertz (Hz)). Designate the lowest measured torque value as "ML", expressed in deciNewton-meter (dN*m). ML indicates the extent of pre-curing of the formulation during the Plaque Preparation Test Method and is a starting point for the present moisture curing using MDR. As the present moisture curing (crosslinking) progresses, the measured torque value increases, eventually reaching a maximum torque value. Designate the maximum or highest measured torque value as "MH", expressed in dN*m. All other things being equal, the greater the MH torque value, the greater the extent of crosslinking. All other things being equal, the shorter the period of time for the torque value to go from ML to 1 pound-inch (1.1 dN*m), the faster the curing rate of the test sample. Conversely, the longer the period of time needed to go from the torque value ML to 1 pound-inch (1.1 dN*m), the slower the curing rate of the test sample. ML indicates the rheology change in curing process, the higher value suggests higher degree of crosslinking. Record the curing time needed to reach ML=1.0 lbf.in (1.1 deciNewton-meter (dN*m)). 1.00 lb.-in.=0.113 Newton-meter (N*m).

Scorch Time Test Method. This method characterizes resistance to scorch of the moisture-curable polyolefin formulation prepared as pellets. The resistance to scorch is the length of time, ts1, it takes to increase torque by 1 pound-inch ((lb.-in.) wherein 1.0 lb.-in.=1.1 dN*m) above the minimum torque (ML) measured at 180° C. using the Moisture Curing Test Method Using MDR. 1.00 lb.- in.=0.113 Newton-meter (N-m). The longer the ts1 time, advantageously the greater the extent of scorch resistance (also known as scorch retardance). The moisture-curable polyolefin formulation may be characterized by resistance to scorch at 180° C. (MDR ts1) measured according to the Scorch Time Test Method of 8 to 16 minutes. In order for a sample to be said to exhibit scorch resistance according to this MDR ts1 method, the measured maximum torque (MH) value should be at least 1.0 dN*m higher than the measured minimum torque (ML) value (i.e., MH−ML 1.0 dN*m). If MH-ML<1.0 dN*m, the sample is characterized as having no scorch resistance.

T90 Crosslinking Time Test Method. This method characterizes curing rate as the length of time (T90) in minutes needed to reach 90% crosslinking. The T90 crosslinking time is the length of time it takes to increase torque from minimum torque ML to 90% of maximum torque MH (0.90MH) measured at 180° C. using the Moisture Curing Test Method Using MDR.

Comparative Examples 1 to 2 (CE1 to CE2): comparative formulations were prepared with a different one of Co(II)(acac)$_2$, Zn(II)(acac)$_2$, Cu(II)(acac)$_2$, or Ti(IV)(acac)$_2$(O-iPr)$_2$, wherein O-iPr is 1-methylethoxide; and the moisture generator (K)-1 and tested according to the above described methods. See results described in Table 1.

TABLE 1

Formulations (wt %) and MDR moisture cure properties: CE1 to CE2.

| Ex. No. | CE1 | CE2 | CE3 | CE4 |
|---|---|---|---|---|
| Prepolymer (A1) | 98.35 | 98.35 | 98.35 | 98.35 |
| Co(II)(acac)$_2$ | 0.15 | 0 | 0 | 0 |
| Zn(II)(acac)$_2$ | 0 | 0.15 | 0 | 0 |
| Cu(II)(acac)$_2$ | 0 | 0 | 0.15 | 0 |
| Ti(IV)(acac)$_2$(O-iPr)$_2$ | 0 | 0 | 0 | 0.15 |
| Moisture generator (K)-1 | 1.5 | 1.5 | 1.5 | 1.5 |
| Total | 100 | 100 | 100 | 100 |
| Minimum Torque ML (dN*m) | 0.32 | 0.25 | 0.27 | 0.77 |
| Maximum Torque MH (dN*m) | 1.15 | 0.36 | 3.34 | 2.64 |
| MH − ML (dN*m) | 0.83 | 0.11 | 3.07 | 1.87 |
| Scorch Resistance (MDR ts1) at 180° C. (minutes) | None | None | 4.72 | 4.96 |
| 90% Crosslinking Time T90 (minutes) | 17.9 | 16.2 | 16.0 | 15.5 |

As shown in Table 1, the comparative formulations showed poor curing as indicated by substantially lower maximum torque values MH.

Inventive Examples 1 to 4 (IE1 to IE4): inventive moisture-curable polyolefin formulations were prepared with either (B)-1 Fe(II)(acac)$_2$, (B)-2 Fe(III)(acac)$_3$, (B)-3 Fe(III)(3-methyl-acac)$_3$, or (B)-4 Fe(III)(1,1,5,5-tetramethyl-acac)$_3$, respectively, and moisture generator (K)-1 and tested according to the above described methods. See results described in Table 2.

TABLE 2

Formulations (wt %) and MDR moisture cure properties: IE1 to IE4.

| Ex. No. | IE1 | IE2 | IE3 | IE4 |
|---|---|---|---|---|
| Prepolymer (A1) | 98.35 | 98.35 | 98.35 | 98.35 |
| Cat. Sys. (B)-1 (Fe(II)(acac)$_2$) | 0.15 | 0 | 0 | 0 |
| Cat. Sys. (B)-2 (Fe(III)(acac)$_3$) | 0 | 0.15 | 0 | 0 |
| Cat. Sys. (B)-3 (Fe(III)(3-methyl-acac)$_3$) | 0 | 0 | 0.15 | 0 |
| Cat. Sys. (B)-4 (Fe(III)(1,1,5,5-tetramethyl-acac)$_3$) | 0 | 0 | 0 | 0.15 |
| Moisture generator (K)-1 | 1.5 | 1.5 | 1.5 | 1.5 |
| Total | 100 | 100 | 100 | 100 |
| Minimum Torque ML (dN*m) | 0.7 | 1.32 | 1.77 | 1.08 |
| Maximum Torque MH (dN*m) | 4.65 | 5.27 | 4.36 | 5.32 |
| MH − ML (dN*m) | 3.95 | 3.95 | 2.59 | 4.24 |
| Scorch resistance (MDR ts1) at 180° C. (minutes) | 1.23 | 0.87 | 0.61 | 1.02 |
| 90% Crosslinking Time T90 (minutes) | 10.5 | 7.8 | 3.6 | 12.0 |

As shown in Table 2, the inventive formulations IE1 to IE4 produced cured products with substantial extent of crosslinking as indicated by substantially greater maximum torque values MH than those of CE1 to CE4 in Table 1. Further, the inventive formulations IE1 to IE4 generally gave faster curing rates, and thus made cured products in less time, as indicated by shorter T90 crosslinking times.

Part B: Formulations that are Free of (Lack) (K) Moisture Generator.

Preparation of Catalyst Masterbatches 1 and 2 (inventive). Into a Brabender mixer (Brabender GmbH & Co KG) at 160° C. and 10 rpm add the HDPE1 until completely melted. To the melt add Antioxidants (E)-1 and (E)-2. Then add the (B) condensation-cure catalyst system (B)-1 or (B)-2, respectively. Mix the resulting formulation at 155° C. and 45 rpm for 2 minutes. Remove the mixture from the mixer, and press samples into plaques with a hot press using the Plaque Preparation Test Method. Cut the plaques into small pellets. Feed the pellets into a single screw extruder to make small pellets of the moisture-curable polyolefin formulation as Catalyst Masterbatch 1 or 2, respectively. The catalyst masterbatches contain 3.33 wt % Antioxidant (E)-1 and 1.67 wt % Antioxidant (E)-2 and 2.6 wt % (B) condensation-cure catalyst system (e.g., (B)-1 or (B)-2). Catalyst masterbatches may be made from (B)-3 or (B)-4 also.

Comparative masterbatches 1 to 5 were each prepared by a procedure that is the same as the procedure of the preparation of Catalyst Masterbatch 1 except in place of the 2.6 wt % of the (B)-1 condensation-cure catalyst system, the comparative masterbatches 1 to 4 contained 1.3 wt % of a different one of the following constituents: Zn(II)(acac)$_2$, Co(II)(acac)$_2$, Co(III)(acac)$_3$, Cu(II)(acac)$_2$, or Ti(IV)(acac)$_2$(O-iPr)$_2$, respectively.

Tape Extrusion and Curing Methods: Dry blend measured amounts of the Catalyst Masterbatch 1 (see Preparation of Catalyst Masterbatch 1) and the (Hydrolyzable silyl group)-functional prepolymer (A)-1 in a weight/weight ratio of 5.8/94.2, respectively, in a plastic bag. Then feed the dry blend into a single extruder operating at 160° C. and 45 rpm, and extrude moisture-curable polyolefin formulations as a 1 mm-thick tape having a width of about 3.5 mm. The formulations are free of (do not contain) (K) moisture generator. Then cut a "dog bone" shaped specimens from the extruded tape, cure the specimens by immersing them in a 90° C. water bath for 3 hours to make inventive examples of the moisture-cured polyolefin product. Measure hot creep of the moisture-cured polyolefin products according to the Hot Creep Test Method.

Hot Creep Test Method. Measures extent of crosslinking, and thus extent of curing, in test samples of the moisture-cured polyolefin products prepared by the Tape Extrusion and Curing Methods. Subject cured (90° C. water bath for 3 hours) test samples (did not contain (K) moisture generator) to hot creep under a load of 20 Newtons per square centimeter ($N/cm^2$) and 200° C., according to ASTM D2655-17 (*Standard Specification for Crosslinked Polyethylene Insulation for Wire and Cable Rated 0 to 2000 V*). After 20 minutes, measure the final length. Cool and measure the length of the tested sample. The amount of extension divided by initial length provides a measure of hot creep as a percentage. Express the extent of elongation of the test sample as a percentage (%) of the length of the tested sample after hot creep conditions relative to the initial length of test sample prior to hot creep conditions. The lower the hot creep percent, the lower the extent of elongation of a test sample under load, and thus the greater the extent of crosslinking, and thus the greater the extent of curing. A lower hot creep value suggests a higher crosslink degree.

Comparative Examples 5 to 9 (CE5 to CE9): comparative formulations were prepared from different ones of the comparative masterbatches 1 to 5, respectively, and were free of moisture generator (K) and tested according to the above described methods. See results described in Table 3.

TABLE 3

Formulations (wt %) and Hot Creep moisture cure properties: CE5 to CE9.

| Ex. No. | CE5 | CE6 | CE7 | CE8 | CE9 |
|---|---|---|---|---|---|
| Prepolymer (A1) | 94.22 | 94.22 | 94.22 | 94.22 | 94.22 |
| HDPE1 | 5.33 | 5.33 | 5.33 | 5.33 | 5.33 |
| Zn(II)(acac)$_2$ | 0.075 | 0 | 0 | 0 | 0 |
| Co(II)(acac)$_2$ | 0 | 0.15 | 0 | 0 | 0 |
| Co(III)(acac)$_3$ | 0 | 0 | 0.15 | 0 | 0 |
| Cu(II)(acac)$_2$ | 0 | 0 | 0 | 0.15 | 0 |
| Ti(IV)(acac)$_2$(O-iPr)$_2$ | 0 | 0 | 0 | 0 | 0.15 |
| Antioxidant (E)-1 | 0.20 | 0.20 | 0.20 | 0.20 | 0.20 |
| Antioxidant (E)-2 | 0.10 | 0.10 | 0.10 | 0.10 | 0.10 |
| Total | 100 | 100 | 100 | 100 | 100 |
| Hot Creep (%), at 200° C. (average of 3 specimens precured at 90° C. for 3 hours) | All broke in <1 minute | All broke in <1 minute | All broke in <1 minute | 112 | 118 |

As shown in Table 3, the comparative formulations of CE5 to CE7 appeared to have minimal or no crosslinking, and thus failed to produce cured products, as indicated by the breaking of all specimens (elongation at break very long) in less than 1 minute. The comparative formulations of CE8 and CE9 appeared to have some crosslinking, but the hot creep values were greater than 100%. Hot creep values of 100% or greater are characterized as "not passing" the hot creep test when evaluating compositions for use as coating layers in cables (e.g., power cables).

Inventive Examples 5 to 6 (IE5 to IE6): inventive moisture-curable polyolefin formulations were prepared from different ones of Catalyst Masterbatches 1 and 2, respectively; and were free of moisture generator (K) and tested according to the above described methods. See results described in Table 4.

TABLE 4

Formulations (wt %) and Hot Creep moisture cure properties: IE5 to IE6.

| Ex. No. | IE5 | IE6 |
|---|---|---|
| Prepolymer (A1) | 94.22 | 94.22 |
| HDPE1 | 5.33 | 5.33 |
| Cat. Sys. (B)-1 (Fe(II)(acac)$_2$) | 0.15 | 0 |
| Cat. Sys. (B)-2 (Fe(III)(acac)$_3$) | 0 | 0.15 |
| Antioxidant (E)-1 | 0.20 | 0.20 |
| Antioxidant (E)-2 | 0.10 | 0.10 |
| Total | 100 | 100 |
| Hot Creep (%), after 20 minutes at 200° C. (average of 3 specimens precured at 90° C. for 3 hours) | 33 | 28 |

As shown in Table 4, the inventive formulations produced inventive cured products with substantially greater crosslinking as indicated by the fact all specimens remained intact after 20 minutes at 200° C. and had hot creep values substantially less than 100%, and thus be characterized as passing Hot Creep test when evaluating compositions for use as coating layers in cables (e.g., power cables). The lower the Hot Creep %, the greater the extent of crosslinking, and the greater the extent of crosslinking, the more suitable the moisture-cured polyolefin product is for use as a coating layer on a power cable.

The excellent performance of the inventive formulations in Hot Creep could not have been predicted from the dismal results obtained with the comparative formulations.

The invention claimed is:

1. A moisture-curable polyolefin formulation comprising:
   (A) a (hydrolyzable silyl group)-functional polyolefin prepolymer; and
   (B) a condensation-cure catalyst system comprising a compound that is an iron(II) acetylacetonate or an iron(III) acetylacetonate, wherein each acetylacetonate is unsubstituted or independently substituted with from 1 to 5 alkyl groups, wherein each alkyl group is unsubstituted (collectively called "iron (alkyl)acetylacetonate");
   wherein the amount of (A) is from 79.0 to 99.99 weight percent (wt %) and the amount of (B) is from 21.0 to 0.01 wt %, respectively, of the moisture-curable polyolefin formulation; and
   wherein the (A) (hydrolyzable silyl group)-functional polyolefin prepolymer is a copolymer of copolymerized ethylene and an alkenyl-functional hydrolyzable silane with the alkenyl-functional hydrolyzable silane positioned along a backbone of the prepolymer.

2. The moisture-curable polyolefin formulation of claim 1 wherein the (A) (hydrolyzable silyl group)-functional polyolefin prepolymer is characterized by any one of limitations (i) to (iii): (i) each hydrolyzable silyl group is independently a monovalent group of formula $(R^2)_m(R^3)_{3-m}Si-$, wherein subscript m is an integer of 1, 2, or 3; each $R^2$ is independently H, HO—, ($C_1$-$C_6$)alkoxy, ($C_2$-$C_6$)carboxy, phenoxy, ($C_1$-$C_6$)alkyl-phenoxy, (($C_1$-$C_6$)alkyl)$_2$N—, ($C_1$-$C_6$)alkyl(H)C=NO—, or (($C_1$-$C_6$)alkyl)$_2$C=NO—; and each $R^3$ is independently ($C_1$-$C_6$)alkyl or phenyl; (ii) the polyolefin portion of (A) is polyethylene based, poly(ethylene-co-($C_3$-$C_{40}$)alpha-olefin)-based, or a combination thereof; and (iii) both (i) and (ii).

3. The moisture-curable polyolefin formulation of claim 1 wherein the (B) condensation-cure catalyst system is any one of (B1) to (B3): (B1) the iron(II) (alkyl)acetylacetonate; (B2) the iron(III) (alkyl)acetylacetonate; and (B3) a combination of (B1) and (B2).

4. The moisture-curable polyolefin formulation of claim 1 wherein each (alkyl)acetylacetonate of the iron (alkyl)acetylacetonate independently is an unsubstituted acetylacetonate or a ($C_1$-$C_6$)alkyl-substituted acetylacetonate.

5. The moisture-curable polyolefin formulation of claim 1 further comprising at least one additive selected from additives (C) to (L): (C) an organic peroxide; (D) a scorch retardant; (E) an antioxidant; (F) a treeing retardant (water treeing and/or electrical treeing retardant); (G) a colorant; (H) a moisture scavenger; (I) a hindered amine light stabilizer; (J) a processing aid; (K) a moisture generator; and (L) a combination of any two or more of (C) to (K).

6. A method of making a moisture-curable polyolefin formulation, the method comprising mixing constituents comprising (A) a (hydrolyzable silyl group)-functional polyolefin prepolymer and (B) a condensation-cure catalyst system so as to give a mixture comprising the (A) and (B); and melting or extruding the mixture so as to make the moisture-curable polyolefin formulation of claim 1.

7. A moisture-cured polyolefin product made by moisture curing the moisture-curable polyolefin formulation of claim 1.

8. A manufactured article comprising a shaped form of the moisture-curable polyolefin formulation of claim 1.

9. A coated conductor comprising a conductive core and a polymeric layer at least partially surrounding the conductive core, wherein at least a portion of the polymeric layer comprises the moisture-cured polyolefin product of claim 7.

10. A method of conducting electricity, the method comprising applying a voltage across the conductive core of the coated conductor of claim 9 so as to generate a flow of electricity through the conductive core.

\* \* \* \* \*